United States Patent
Kocarev et al.

(10) Patent No.: US 10,218,179 B2
(45) Date of Patent: Feb. 26, 2019

(54) METHOD AND SYSTEM FOR DYNAMIC INTELLIGENT LOAD BALANCING

(71) Applicant: The Regents of the University of California, Oakland, CA (US)

(72) Inventors: Ljupco Kocarev, La Jolla, CA (US); Vladimir Zdraveski, Skopje (MK); Mirko Todorovski, Skopje (MK)

(73) Assignee: The Regents of the University of California, Oakland, CA (US)

( * ) Notice: Subject to any disclaimer, the term of this patent is extended or adjusted under 35 U.S.C. 154(b) by 174 days.

(21) Appl. No.: 15/124,190

(22) PCT Filed: Mar. 3, 2015

(86) PCT No.: PCT/US2015/018482
§ 371 (c)(1),
(2) Date: Sep. 7, 2016

(87) PCT Pub. No.: WO2015/134494
PCT Pub. Date: Sep. 11, 2015

(65) Prior Publication Data
US 2017/0093161 A1 Mar. 30, 2017

Related U.S. Application Data

(60) Provisional application No. 61/949,702, filed on Mar. 7, 2014.

(51) Int. Cl.
*G05D 3/12* (2006.01)
*H02J 3/28* (2006.01)
(Continued)

(52) U.S. Cl.
CPC .............. *H02J 3/28* (2013.01); *G05F 1/66* (2013.01); *G06Q 10/06* (2013.01); *G06Q 50/06* (2013.01); *H02J 13/0006* (2013.01)

(58) Field of Classification Search
CPC ........... H02J 3/28; H02J 13/0006; G05F 1/66; G06Q 50/06
See application file for complete search history.

(56) References Cited

U.S. PATENT DOCUMENTS 5,579,194 A * 11/1996 Mackenzie .......... H01H 47/325
341/128
6,404,655 B1 6/2002 Welches
(Continued)

FOREIGN PATENT DOCUMENTS

CN 103259276 8/2013
CN 102035423 B 9/2013

OTHER PUBLICATIONS

Chen, T.H., et al., "Three-phase cogenerator and transformer models for distribution system analysis", IEEE Transactions on Power Delivery, vol. 6, Issue 4, (Oct. 1991), pp. 1671-1681.
(Continued)

*Primary Examiner* — Adam Lee
(74) *Attorney, Agent, or Firm* — Greer, Burns & Carin, Ltd.; Steven P. Fallon (57) ABSTRACT

Intelligent load balancing is conducted by monitoring loads in phases at nodes and commanding phase switches of a plurality of nodes to rotate phases. Preferred embodiments identify load balancing problems among phases in three-phase systems and utilize a modified legacy network of power meters or an existing smart network of power meters to implement a control algorithm that achieves dynamic, intelligent load balancing.

16 Claims, 6 Drawing Sheets

(51) Int. Cl.
*G06Q 10/06* (2012.01)
*G06Q 50/06* (2012.01)
*G05F 1/66* (2006.01)
*H02J 13/00* (2006.01)

(56) References Cited

U.S. PATENT DOCUMENTS

| | | | | |
|---|---|---|---|---|
| 9,820,406 | B1* | 11/2017 | Errato, Jr. | H05K 7/20145 |
| 2010/0123440 | A1* | 5/2010 | Bandholz | H02M 3/1584 |
| | | | | 323/272 |
| 2011/0054709 | A1* | 3/2011 | Son | H02J 3/06 |
| | | | | 700/286 |
| 2012/0078428 | A1* | 3/2012 | Henderieckx | H02J 3/26 |
| | | | | 700/292 |
| 2012/0078430 | A1* | 3/2012 | Fan | G06F 1/329 |
| | | | | 700/295 |
| 2012/0092811 | A1* | 4/2012 | Chapel | H04L 12/10 |
| | | | | 361/622 |
| 2012/0175951 | A1* | 7/2012 | Pamulaparthy | H02J 3/26 |
| | | | | 307/11 |
| 2012/0249121 | A1* | 10/2012 | Pamulaparthy | G01D 4/002 |
| | | | | 324/86 |
| 2012/0281444 | A1* | 11/2012 | Dent | H02M 7/53871 |
| | | | | 363/56.01 |
| 2012/0316691 | A1* | 12/2012 | Boardman | H02J 3/26 |
| | | | | 700/293 |
| 2013/0035887 | A1* | 2/2013 | Fan | G01D 4/002 |
| | | | | 702/72 |
| 2013/0062970 | A1* | 3/2013 | Maier | H02J 3/26 |
| | | | | 307/130 |
| 2013/0063280 | A1 | 3/2013 | Pamulaparthy et al. | |
| 2013/0178993 | A1 | 6/2013 | Rombouts et al. | |
| 2013/0208594 | A1* | 8/2013 | Thubert | H04L 47/125 |
| | | | | 370/235 |
| 2013/0218497 | A1* | 8/2013 | Stanlake | H02J 3/26 |
| | | | | 702/65 |
| 2013/0325376 | A1* | 12/2013 | Turicchi, Jr. | H02J 3/26 |
| | | | | 702/60 |
| 2014/0021917 | A1* | 1/2014 | Paupert | B60L 11/1818 |
| | | | | 320/109 |
| 2014/0191736 | A1* | 7/2014 | Babazadeh | H02M 3/1582 |
| | | | | 323/271 |
| 2015/0109837 | A1* | 4/2015 | Pan | H02M 7/06 |
| | | | | 363/126 |

OTHER PUBLICATIONS

De Castro, Arnie, et al., "Smarter Grid Operations with SAS/OR"; SAS Global Forum 2013, Paper 156-2013; Publication [online], (Apr. 2013) [retrieved May 11, 2015]. Retrieved from the Internet: <URL: https://support.sas.com/resources/papers/proceedings13/156-2013.pdf>, 12 pages.

Dilek, M., et al., "Simultaneous phase balancing at substations and switches with time-varying load patterns", IEEE Transactions on Power Delivery, vol. 16, Issue 4, (Nov. 2001), pp. 922-928.

Hsu, Y.Y., et al., "Transformer and feeder load balancing using a heuristic search approach", IEEE Transactions on Power Delivery, vol. 8, Issue 1, (Feb. 1993), pp. 184-190.

Niknam, T., et al., "Multi-objective daily operation management of distribution network considering fuel cell power plants.", IET Renewable Power Generation, vol. 5, Issue 5, (Sep. 2011), pp. 356-367.

Xin, H., et al., "A Self-Organizing Strategy for Power Flow Control of Photovoltaic Generators in a Distribution Network", IEEE Transactions on Power Delivery, vol. 26, Issue 3, (Aug. 2011), pp. 1462-1473.

Zhu, J., et al., "Phase Balancing using Mixed-Integer Programming", IEEE Transactions on Power Delivery, vol. 13, Issue 4, (Nov. 1998), pp. 1487-1492.

Zhu, J., et al., "Phase Balancing using Simulated Annealing", IEEE Transactions on Power Delivery, vol. 14, Issue 4, (Nov. 1999), pp. 1508-1513.

Thomas, Shane, "International Written Opinion and Search Report", Patent Cooperation Treaty International Searchint Authority; dated Jun. 12, 2015, 9 pages.

* cited by examiner

DILB Server

Active Clients

| Name | Token | Last Checked | Time Step | Pr | Ps | Pt | oldS | newS |
|---|---|---|---|---|---|---|---|---|
| Client1 | TestToken | 2014-11-08 11:17:03 | 15 | 3 | 2 | 8 | 0 | 0 |
| Client2 | TestToken1 | 2014-01-01 10:10:10 | 15 | 3 | 2 | 6 | 0 | 0 |
| Client3 | TestToken2 | 2014-01-01 10:10:10 | 15 | 6 | 2 | 9 | 0 | 0 |

METHOD AND SYSTEM FOR DYNAMIC INTELLIGENT LOAD BALANCING

PRIORITY CLAIM AND REFERENCE TO RELATED APPLICATION

The application claims priority under 35 U.S.C. § 119 and all applicable treaties from prior provisional application Ser. No. 61/949,702, which was filed Mar. 7, 2014.

FIELD

A field of the invention concerns distribution of power in networks.

BACKGROUND

Power distribution networks transmit three phase power from a power generation plant to power stations over transmission lines. The three phases are of equal frequency and magnitude, but are offset by one third of the phase. The sum of the currents is zero and a transmission line for one phase can therefore act as the return path for the lines of the other two phases. When loads on the phases are equal, this represents a balanced condition, which is ideal for efficiency. Variation from the balanced condition reduces efficiency. At power stations, transformers step down transmission line voltages. Feeder medium voltage lines carry voltage to a final transformer that reduces voltage to load usage levels, e.g. 120V and 240V. The connections of customers are made to distributed loads on the three phases. Modern power distribution networks include complex systems for managing distribution of the power. Complex tools help to visualize and predict network conditions, and act as a support system to personnel to take control steps. However, mere visualization and simulation tools provide little help in terms of analysis or improvement of distribution, due to the complexity of the distribution systems. Power distribution networks face growing and highly variable (low to high and high to low) load demands. At installation, loads are usually balanced across a three-phase distribution system. Unbalance arises from growth of the load demand as well as changes in load demand during time period. Balanced feeders can drift over time to unbalance. Instabilities and unbalances can produce substantial power losses in a network and can cause power outages.

Static or dynamic corrections are traditionally used to stabilize networks. The corrections provide voltage regulation to maintain voltage within an allowable tolerance of a desired constant value. Networks also include capacitor banks that counteract power factor lag and phase shifts.

Phase swapping is a direct technique that seeks to balance a system at each load point of a feeder system. Various researchers have explored phase swapping approaches for load balancing. In practice, phase adjustments are made manually according to a calculated phase vector. Manual adjustments are conducted infrequently, such as once a year during equipment maintenance or service. Load conditions can vary greatly during the interval between manual adjustments, causing the network to depart from the calculated phase vector, leading to higher power losses.

One heuristic search algorithm for calculating vectors to perform such manual adjustments considered measured constant and changing load. This algorithm and manual adjustment approach was tested within the service area of the Taipei South District. Y.-Y. Hsu, J.-H. Yi, S. S. Liu, Y. Chen, H. C. Feng, and Y. M. Lee, "Transformer and feeder load balancing using a heuristic search approach," Power Systems, IEEE Transactions on, vol. 8, pp. 184-190, February 1993. A positive impact was observed.

Additional efforts have been made to accurately characterize a power distribution network to improve performance between manual adjustments. Various example approaches are discussed in the following paragraphs.

A mixed integer programming formulation for phase swapping has been considered. J. Zhu, M.-Y. Chow, and F. Zhang, "Phase balancing using mixed-integer programming [distribution feeders]," Power Systems, IEEE Transactions on, vol. 13, pp. 1487-1492, November 1998. Single-phase loads are treated differently than three-phase loads. Nodal phase swapping and lateral phase swapping are discussed in that paper.

Simulated Annealing (SA) is another heuristic algorithm. J. Zhu, G. Bilbro, and M.-Y. Chow, "Phase balancing using simulated annealing," Power Systems, IEEE Transactions on, vol. 14, pp. 1508-1513, November 1999. This technique formulates the phase balancing problem as Mixed-Integer Programming (MIP) approach and provides a global solution calculation.

Another heuristic approach rephases single- and double-phase laterals in to circuit loss while also maintaining/improving imbalances at various balance point locations. M. Dilek, R. Broadwater, J. Thompson, and R. Seqiun, "Simultaneous phase balancing at substations and switches with time-varying load patterns," Power Systems, IEEE Transactions on, vol. 16, pp. 922-928, November 2001. The algorithm allows a limit on the number of phase move operations and exclusion of certain laterals.

A multi-objective fuzzy self-adaptive particle swarm optimization evolutionary algorithm considering fuel cell power plants in the distribution network has been proposed. T. Niknam, H. Meymand, H. Mojarrad, and J. Aghaei, "Multi-objective daily operation management of distribution network considering fuel cell power plants," Renewable Power Generation, IET, vol. 5, no. 5, pp. 356-367, 2011.

A distributed control algorithm that can regulate the power output of multiple photovoltaic generators (PVs) has also proposed. H. Xin, Z. Qu, J. Seuss, and A. Maknouninejad, "A self-organizing strategy for power flow control of photovoltaic generators in a distribution network," Power Systems, IEEE Transactions on, vol. 26, no. 3, pp. 1462-1473, 2011.

Many researches have proposed models to accurately characterize systems. These models are helpful to understand systems and unbalance issues that can arise. See, e.g. T.-H. Chen, M.-S. Chen, T. Inoue, P. Kotas, and E. Chebli, "Three-phase cogenerator and transformer models for distribution system analysis," Power Delivery, IEEE Transactions on, vol. 6, no. 4, pp. 1671-1681, 1991.

Unbalance remains a practical problem despite significant efforts to better characterize networks and provide strategies to initially set and later make manual adjustments. Efforts to maintain balance are conducted during maintenance or when a new load is added. Periodically, work crews rebalance feeders during periods of maintenance or restoration, when a new customer is to be connected, or if the percentage of unbalance exceeds some number and the phase balance for existing feeders has become significantly unbalanced. Three factors are normally considered in making a decision to re-balance a feeder: the monetary cost of making the tap change(s), the expected increase in feeder balance and the temporary interruption of power to the customer. Current phase rebalance is complicated and typically conducted manually at sufficient expense. Legacy power meters that remain in widespread operation lack the ability to communicate, be programmed or adjusted except for by costly manual service.

SUMMARY OF THE INVENTION

An embodiment of the invention is a method for dynamic load balancing in a power network. In the method, networking is conducted with a plurality of nodes in the power network. The nodes include power metering and phase switches. Power is monitored in multiple phases through the power metering at a plurality of nodes. Balancing is conducted by commanding one or more of the phase switches to rotate phases to balance load distribution among the phases of the plurality of nodes. Preferably, the balancing is conducted from leaf nodes up in a bottom-up process until a root node is reached. In a preferred embodiment, power vectors are determined at each of the plurality of nodes that includes the power for each of the multiple phases. A matrix is arranged for the power vectors. Selected phases are rotated to reduce differences among loads in phases. Phase are rotated without altering phase order. Ad hoc and client server models are applied in preferred methods.

A preferred device for a power distribution network includes connections for a power source and a load. A power meter monitors power drawn by the load on a plurality of phases. The device can communicate to send measured power and receive phase rotation commands. A phase rotation switch can rotate phases delivered from the source to the load by switching the connections between the source and the load.

A preferred device for converting a power metering node in a power distribution network includes phase switches to rotate connections of phase contacts. The device further includes a processor and switching board to connect between a source and a load meter, the processor and switching board comprising communications to communicate with another device and control to control the rotation state of the phase switch.

A preferred dynamic load balancing system includes an adjuster that can adjust phase at a lower level node. A monitor monitors a plurality of loads at the lower level and commands phase adjustments to reduce load differences between phases.

DETAILED DESCRIPTION OF THE PREFERRED EMBODIMENTS

An embodiment of the invention is a method for dynamic intelligent load balancing (DILB) in a power distribution network that applies a hierarchical, client-server addressing concept and identifies the load balancing problem among phases in three phase systems. Preferred methods of the invention are readily applicable to every part of a power distribution network, without essential changes to the last-line power installation. Preferred embodiments provide a more stable power distribution network with improved characteristics and decreased active power losses. Preferred embodiments identify load balancing problems among phases in three-phase systems and utilize a modified legacy network of power meters or an existing smart network of power meters to implement a control algorithm that achieves dynamic, intelligent load balancing A preferred embodiment of the invention is a smart phase switch that can be added to a commonly used power meter. The DILB-extended power distribution network is aware of the load unbalance and can minimize it with an optimal dynamic configuration of the phase switches embedded in the power meters. Another embodiment is a relay based switching board that includes a controller board and communications network capability. In other embodiments, switching can be achieved via thyristors or other power switches, which can be termed a phase swapping module. A switch set up needs to provide the ability to rotate phases.

Preferred embodiments apply a hierarchical, client-server addressing style approach to identifying load balancing problems among phases in three phase systems to achieve dynamic intelligent load balancing (DILB) with a an uncomplicated control algorithm. Embodiments of the invention can decrease power losses in power distribution networks, and can be applied to existing power distribution networks without essential changes to the last-line power installation. Preferred embodiments provides a DILB-extended power distribution network architecture. Simulations of preferred embodiments have been conducted on the well-known IEEE 34-Bus, 37-Bus and 123-Bus networks, and confirm an expected level of active power losses minimization.

Preferred embodiments can also be applied to systems that included newer digital power meters that have computational and communication capabilities. Typical digital power meters are placed in installation panels, and some are connected to a local computer network or further maintained via the Internet. The network of smart power meters provides a platform to implement intelligence and advanced dynamic algorithms of the invention to provide a more stable and economic power distribution network.

Preferred embodiments modify an existing power distribution network with a DILB power meters (a power meters with the DILB add-on), that will be also mutually connected via the power distribution network cables using some of the modulated signal techniques. All the load behind the power meter (a house, flat and etc.) can be equalized with a three-phase load, that could be rotated in order to result in a phase-balanced power distribution network.

Another embodiment places phase switches in each power outlet or device, which can provide better balancing results. This provides a highly granular form of control to achieve balance in a network A unit that is delivered power, such as a house or a business, is considered as a three-phase load phase rotations are conducted recursively implemented in the same manner top-down to outlets and devices within the house or business.

In an embodiment, an analogy to the approach dynamic host configuration protocol (DHCP) can be applied. In the DILB embodiment, a smart power distribution network will be a single DILB server (analogous to the DHCP server), but instead of dynamic assignment of IP addresses, its job is to assign the value of s (−1, 0 or 1) to every node (e.g., every power meter). The algorithm running inside the DILB server is aware of the power distribution network's tree topology in order to generate the optimal vector $S_{min}$. It starts from the root node and recursively balances all of the nodes in the power distribution network. Leafs are balanced first and then the bottom-up process moves to the current parent, until the root is reached.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Figure 1:
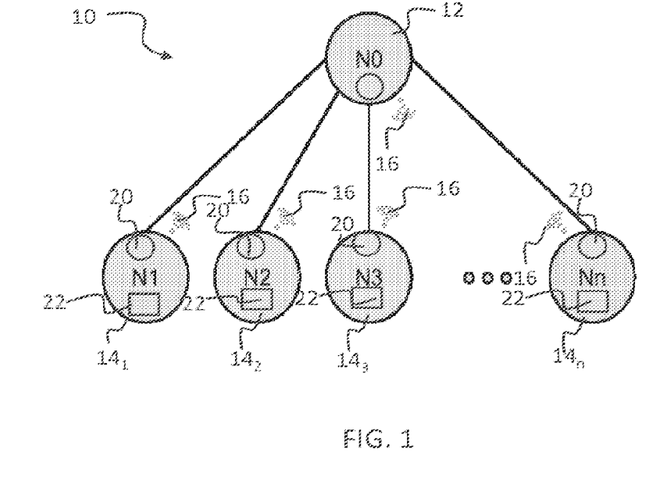
FIG. 1 is a schematic diagram of a simplified power distribution network architecture showing one parent node and its children that is part of a preferred embodiment dynamic load balanced network of the invention.

FIG. 1 is a simplified power distribution network 10 showing small size tree of one parent node 12 and n child nodes $14_1$-$14_n$ arranged in two levels. The nodes 12 and $14_1$-$14_n$ are networked to communicate, such as via wireless transmissions 16. FIG. 1 shows a small part of a typical power distribution network, but no further constraints need to be defined. The invention is scalable and the small tree is illustrative for purposes of describing a preferred embodiment.

The network 10 of FIG. 1 can be considered to describe a last-line of power installation. In such an example, the node 12 (N0), can be considered as a central power meter in a building and nodes $14_1$ (N1) to $14_n$ (Nn) as power meters in each unit of the building, for example an office, business or residence. The node N0 can be considered a substation of a higher level of the power network and be on a same level with additional nodes from N1 to Nn.

In the case where the nodes include legacy equipment, the preferred embodiment adds an intelligent phase switch 20 in each leaf node (N1 to Nn) and also a microcontroller 22 that will drive the phase switch. The phase switch 20 can be non-manual corollary to commercial manual switches or take other forms, such as a group of relays or a phase module with electronic switches. The switches operate upon a command received via electrical signals, such as wired or wireless signals. No operator is needed to conduct the phase rotation, which is automatic upon reception of a command from the microcontroller 22. The controllers of multiple nodes are networked via the wireless transmissions 16 or a wired connection. Example wireless connections include wifi and Bluetooth. Example wired connections include a modulated signal through the power distribution network wires themselves. A particularly preferred embodiment embeds the phase switch inside existing meters and one meter can perform additional tasks, for example, consider N1 to Nn as unit meters and N0 as a summary meter in a local substation or building. In other embodiments, communications are established with digital power meters that may already include switching and processing capabilities.

In accordance with preferred embodiments, each microcontroller 22 measures the current and voltage (in order to calculate the power) in its node with a predefined sampling rate. In preferred embodiments, this measurement is conducted continuously. In other embodiments, the measurement is conducted periodically or when instructed through the network established via the communications medium 16. After measurement, all nodes will synchronize to each other and move the phase switches in positions that result in a maximal load balance in the root node (N0 in the example case). In a more optimal scenario (for a fast initial implementation), the root node N0 can be omitted as a summary node it and nodes $N_1$ to $N_n$ form an ad-hoc network and do the synchronization themselves. In embodiments with digital switches, the principal is the same, with switches being synchronized to balance the load.

The scale of the network should be set to provide sufficient communication channel bandwidth and processing power in the node-controllers. Targeting a more scalable and enterprise architecture, an abstraction paradigm uses the simplified network from FIG. 1 as a building block of a more complex power distribution network. Following the concept of network of networks, the result will be a network of the same type, except that nodes will also be networks. This provides scalability, while making communications and balancing at the more granular node level efficient.

Figure 2:
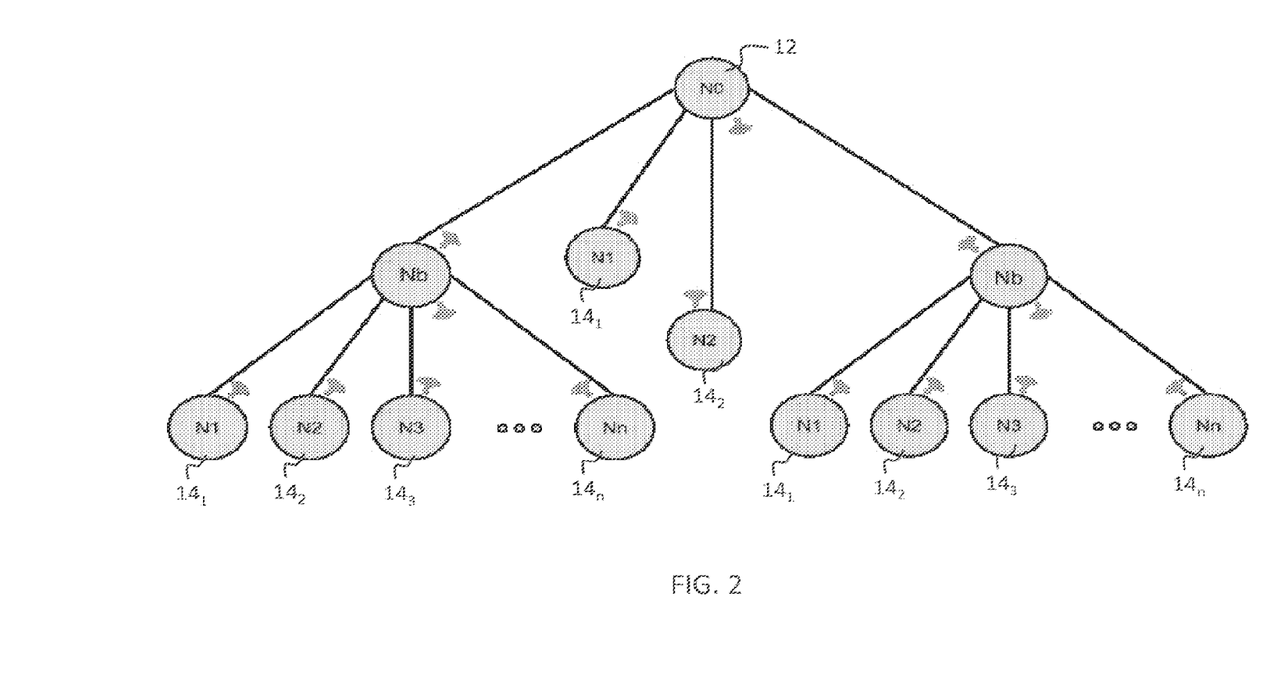
FIG. 2 is a schematic diagram of a generalized power distribution network architecture according to a preferred embodiment dynamic intelligent load balanced network of the invention.

FIG. 2 shows that a network of the invention can be recursively extended, resulting in a network shown in FIG. 2. Nodes are labelled as in FIG. 1, with details omitted. Additional border nodes 24 (Nb) have two communication interfaces, with one interface dedicated toward the No node that is a parent of the Nb node and the other interface dedicated to the nodes N1-Nn that form children of the Nb nodes. These Nb nodes perform level abstraction so that node N0 is not aware of the existence of the nodes N1 to Nn, in both left and right subtrees. Nodes with the same ID's may exist in different private networks, which is an addressing scheme similar to the IP addressing in computer networks and NAT (Network Address Translation). Nodes marked as Nb, the border nodes obtain an ID dynamically from the parent node N0. The concept is scalable, so N0 may also be a border node in another larger power distribution network and so on.

Extending the concept of balancing a single node to a whole tree, i.e. a real power distribution network, provides a more stable and reliable power distribution network with a decreased power losses. A preferred option of integrating the DILB concept in a power distribution network is a power meter add-on that plays the phase switch role. The power measuring functionality from the power meter is simply inherited.

Preferred DILB Algorithm

The network of FIG. 1 or FIG. 2 operates with a preferred embodiment DILB algorithm. According to the preferred DILB algorithm, each node will calculate the power value for each phase at that node. We define $P_j$, the vector of power values by phase at a given node $N_j$, as $$P_j = [P_{rj} P_{sj} P_{tj}]^T, \qquad (1)$$

where T denotes the transpose. Vectors are arranged in a matrix:

$$P_{rst} = \begin{bmatrix} P_{r1} & P_{r2} & & P_{rn} \\ P_{s1} & P_{s2} & \cdots & P_{sn} \\ P_{t1} & P_{t2} & & P_{tn} \end{bmatrix}. \qquad (2)$$

Optimal load balance seeks to minimize the difference among loads by phase, d, i.e., to minimize the expression $$d = 100 * \frac{|P_r - P_s| + |P_s - P_t| + |P_t - P_r|}{2 * (P_r + P_s + P_t)}, \qquad (3)$$

where $$P_r = \sum_{j=1}^{n} P_{rj} \quad (4)$$

stands for the row sum of the first row of the matrix $P_{rst}$ which is the total load of the phase r measured by the node $N_0$ for a given leaf node $N_i$. Similarly, $P_s$ and $P_t$ stand for the total load by s and t, respectively, and are defined as $$P_s = \sum_{j=1}^{n} P_{sj} \text{ and } P_t = \sum_{j=1}^{n} P_{tj}.$$

The expression in (3) contains 2 in the denominator to maintain the value between 0 (optimal case) and 100% (a border case with the whole load through in one phase and zero loads through other two phases).

To configure child nodes state to achieve a minimal d ($d_{min}$) for a given values of $P_{rst}$ requires setting the phase (via relay based switches or digital switches) in a state that will result in an optimal load balance by phase, measured in $N_0$. Because the three-phase direction must not be changed (in order to avoid reversal of rotation in three-phase induction motors), the only possible moves in the system would be to rotate the phase without changing the order of the phases. Thus, a phase rotation from RST→TRS is permitted but a phase order change from RST→SRT is not permitted. In the embodiments with cam switches as nodes, a rotation of the cam switch clockwise or counterclockwise rotates the phase without changing the order of phases. The same restraint can be applied via digital phase rotation switches.

In terms of the matrix $P_{rst}$, a switch can rotate each column with a step 1 (−2) or 2 (−1) or can leave it in its current position.

A positive rotation is defined as:

$$[P_{rj} P_{sj} P_{tj}]^T \rightarrow [P_{tj} P_{rj} P_{sj}]^T \quad (5)$$

and a negative rotation as $$[P_{rj} P_{sj} P_{tj}]^T \rightarrow [P_{sj} P_{tj} P_{rj}]^T. \quad (6)$$

The designations +1, −1 or 0 can be used to describe the phase switch transition, so that the solution of the minimization problem will be a vector $$S = [1 \ 0 \ -1 \ 0 \ 0 \ -1 \ \ldots \ 1]^T \quad (7)$$

such that the value $s_j$ will describe the transition of the phase switch j.

During operation, unnecessary movement of the phase switch should be avoided (zeros in S are welcomed). Preferably, heavily loaded switches are rotated less than the lightly loaded switches. Minimization can be a tradeoff between the number of moves and the load difference. The minimal phase load difference can depend on network and user/organization goals and priorities. These can be accounted for via an argument of the minimization function ($d_{min}$) and the algorithm can calculate a minimal solution vector $S_{min}$ resulting in $d \le d_{min}$, optimizing the number of moves or can calculate a vector $S_{min}$ causing as small d as possible (when $d > d_{min}$), with no constraints on the moves.

A simple illustration of the algorithm, using a simplified network with 7 nodes is as follows. The initial matrix of the nodes measurements in a specific point of time (in Kilowatts) is $$P_{rst} = \begin{bmatrix} 51.934 & 42.959 & 38.607 & 2.275 & 13.698 & 43.092 & 77.282 \\ 76.908 & 40.716 & 40.860 & 43.187 & 13.692 & 47.691 & 79.660 \\ 65.656 & 38.539 & 40.932 & 9.120 & 9.156 & 45.620 & 80.010 \end{bmatrix}.$$

$P_{rst}$ is the input matrix of the algorithm, which also gets $d_{min}$ as an input parameter, thus DILB($P_{rst}$, $d_{min}$). The transformed matrix (shown with original order to clearly illustrate the phase rotations) is given by $$P_{min} = \begin{bmatrix} 65.656 & 42.959 & 40.860 & 2.275 & 13.698 & 45.620 & 77.282 \\ 51.934 & 40.716 & 40.932 & 43.187 & 13.692 & 43.092 & 79.660 \\ 76.908 & 38.539 & 38.607 & 9.120 & 9.156 & 47.691 & 80.010 \end{bmatrix},$$

whereas the phase switches states vector is $$S_{min} = [-1 \ 0 \ 1 \ 0 \ 0 \ -1 \ 0]^T.$$

A preferred implementation of the algorithm is recursive. At the beginning, the columns of the matrix are sorted in an ascending order (note that above matrix is not sorted) by the column sum the columns of the matrix are sorted in ascending order by the column sum and then the minimization starts from the lightly loaded node (leftmost after the sort) to avoid unnecessary movement of heavily loaded switches. Calculating in a debt-first manner, the procedure ends when $d \le d_{min}$ is found.

The algorithm was simulated using 9 power meters' log files, that contain voltage and current records measured in a 15 minutes time stamp. Each log file contains measurements for one month (August 2013), starting from 01.08 00:00 to 31.08 23:45. Log files were randomly chosen from a publicly available data set of the industrial power meters in a local area. Using these power meters, we simulate a simplified network with a topology shown in FIG. 1 and n=9. The node $N_0$ in this case will be a local substation, that supplies the selected industrial consumers, whose power load is measured by meters. In practice, there are many other consumers (power meters) connected to the substation, The illustrative simplified analysis considers only few. At the beginning, the total amount of energy was calculated by $$[E_r E_s E_t] = [34.626 \ 33.471 \ 33.141] \text{MWh} \quad (8)$$

and its unbalance $d_{E\_total} = 1.4668\%$.

If values of (8) are calculated separately for each node and merged in a matrix, similar to $P_{rst}$, a first check can be made to see if there is a better positioning (thus an initial $s \ne [0 \ 0 \ \ldots \ 0]$) of the phase switches that will result in a smaller load unbalance. A better initial s can thus be chosen in a static way, i.e., without any dynamic movement of the phase switches. The improvement of the load balance is clear and there is no worse behaviour in any part of the system compared to the initial one. So, if phase switches of our 9 power meters were only positioned according to $$s_{static} = [0 \ -1 \ 1 \ 0 \ -1 \ -1 \ -1 \ 1]^T \quad (9)$$

which results in $d_{E\_total\_static} = 0.1729\%$ that is a significant improvement, compared to (8).

Such static corrections can be carried out periodically. For example, the algorithm can analyze measurements in a year or a month and then position phase switches according to the optimal $S_{static}$.

Figure 3:
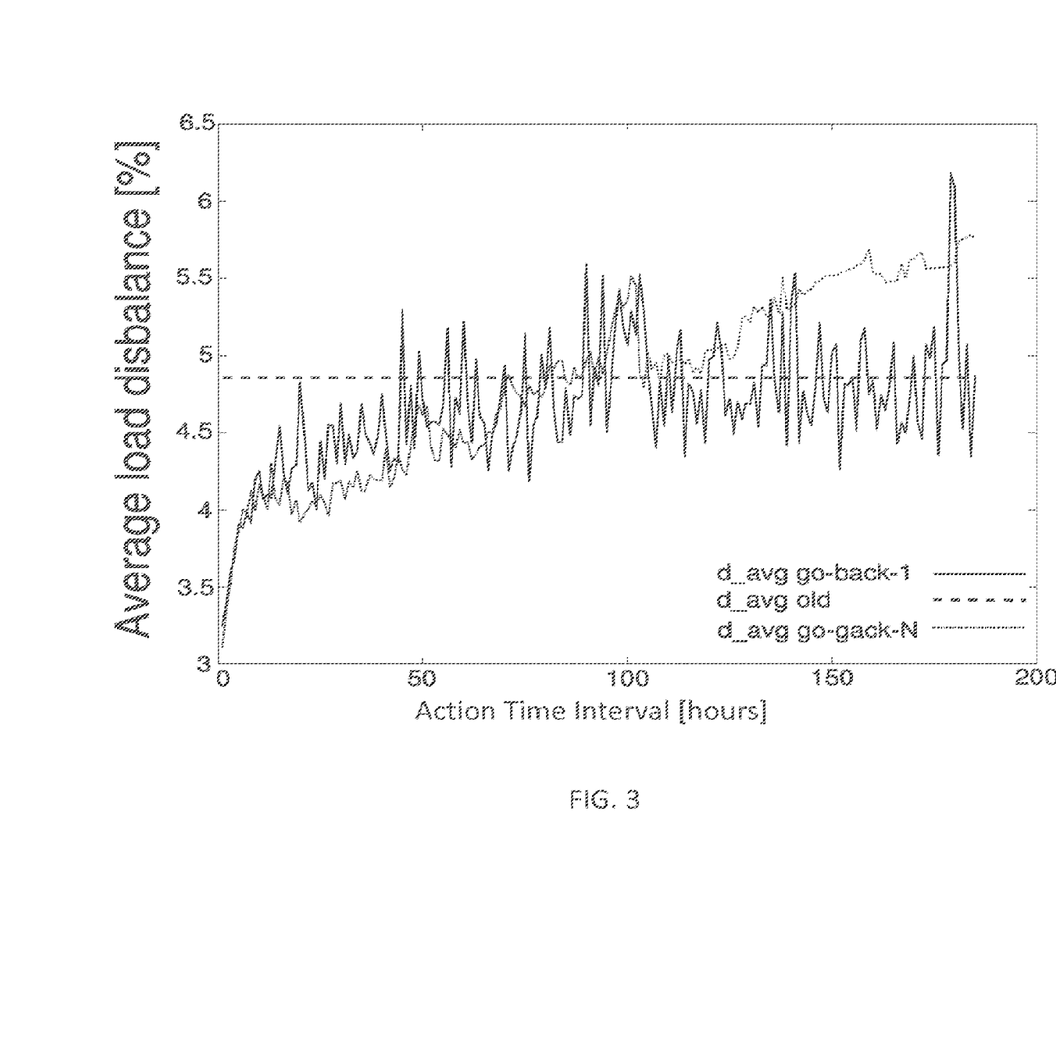
FIG. 3 presents simulation results of data showing average load unbalance as a function of cam switch rotation time interval for dynamic intelligent load balancing in experiments to demonstrate the invention.

Continuous monitoring and correction can also be applied. Allowing continuous dynamic movements of the phase switches, preferred embodiments utilize two fast and simple concepts to calculate the next phase switches state, s. A first one (case 1) is to remember the last measurement only (from the last 15 minutes) and use it to calculate the next s. The second concept (case 2) is to sum up the N previous measurements (from the last phase switch reconfiguration moment) and use the result to calculate the next s. The average load unbalance values obtained by using these two concepts are shown in FIG. 3, where the $d_{avg\_go\_back\_1}$ is for the first concept and $d_{avg\_go\_back\_N}$ for the second one.

The average disbalance for each of the 2976 (4*24*31) records is $$d_{old\_avg} = \frac{\sum_{i=1}^{2976} d_i}{2976} = 4.9\% \qquad (11)$$

where "old" refers to the initial system configuration, without any corrections. Load balance optimization according to the case scenario 1 has resulted in $d_{avg\_case1}$=3.1% and the case scenario 2 has resulted in d_(avg_case2)=3.3%. The case scenario 1 is faster and consumes less memory, but the result is a bit unpredictable and worse than the result in case scenario 2 which is slower and requires more memory.

Any movement of the phase rotation switches during everyday operation can be considered as a negative factor due to a short voltage failure during the rotation. For this reason, rotations should be limited, such as conducting a rotation once per hour or once a day. This provides a more stabilized but balanced DILB power distribution network in terms of loads by phase. The rotation algorithm can even learn the system (PDN) behavior and change itself in order to become more suitable to its PDN.

Experiments were conducted to determine the optimal time interval allowed for a phase switch manipulation. The average unbalance as a function of the switching time interval is a function of FIG. 3. The plot of $d_{avg\_go\_back\_N}$ shows a significant balance improvement even for a switching intervals longer than 48 hours (2 days) which confirms the hypothesis of possible improvement without frequent rotations of the cam switches. It is important to note that a more complex switching algorithms and implementation of a load prediction (with machine learning or other method) is expected to result in a more accurate phase switches state determination and a more effective load balancing mechanism as a whole.

Smart Distribution Network

An optimal way of integrating the invention in a large scale power distribution network is possible via power meter modifications or replacements, or the use of existing smart meters in a network. In any case, the inherent power measuring functionality from the power meter is leveraged.

Figure 4:
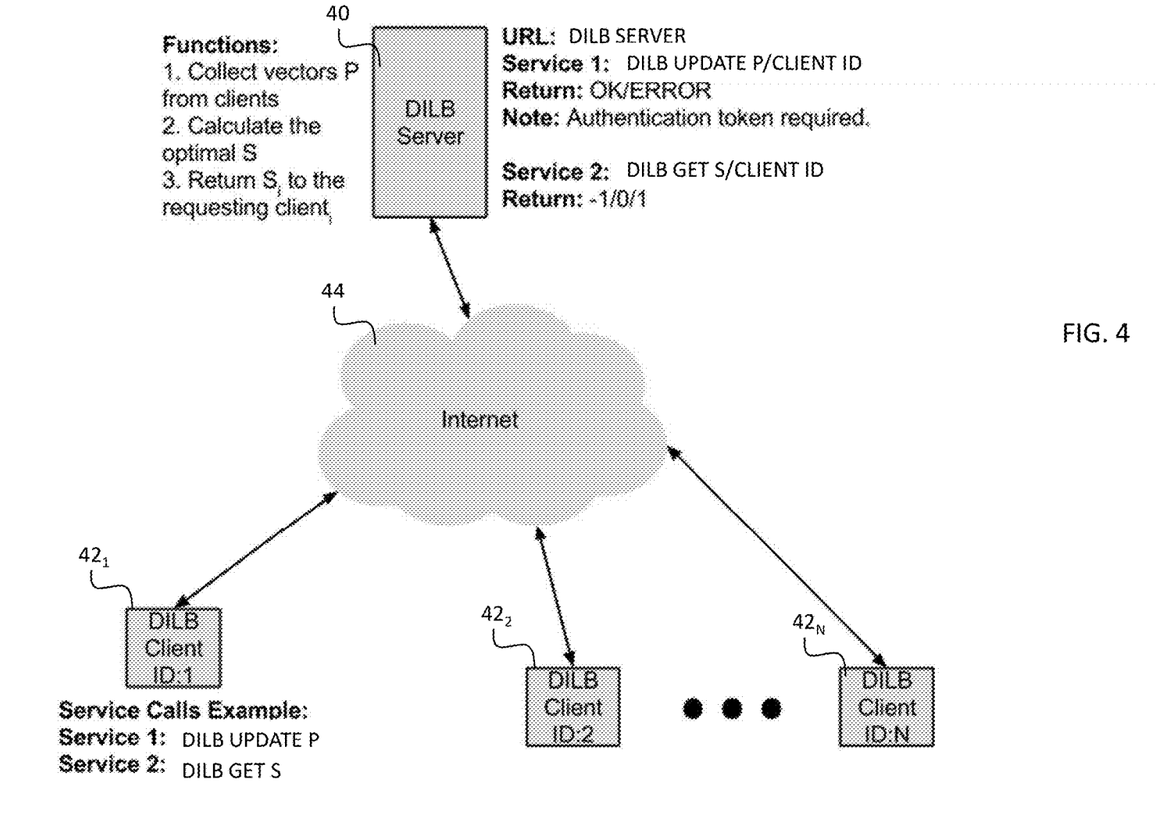
FIG. 4 is a schematic diagram of a preferred embodiment dynamic intelligent balancing architecture of the invention.

Preferred embodiments provide a smart network of DILB smart power meters that are mutually connected via power cables via modulated signal techniques and/or access Internet connections. Communications can be conducted according to an analogy of dynamic host configuration protocol (DHCP). This is illustrated in FIG. 4, where there is a central DILB server 40 communicates with client nodes $42_1$-$42_N$ via the Internet 44. The DILB server 40 is analogous to a DHCP server. Instead of dynamic assignment of IP addresses, the server 40 assigns the value of s (−1, 0 or 1) to every client in the network, e.g. power meter.

The DILB server 40 is aware of the tree topology of the power distribution network to generate the optimal vector $S_{min}$. The server 40 can act to achieve a minimum in (1) the load balance in the PDN root or some other node (or a priority list of nodes) or (2) the total power loss in the PDN.

In a large network, the solution can be complex. The previously mentioned $d_{min}$ states is for a single PDN node only, whereas the total PDN load balance descriptor $D_{PDN}$ is a more complex expression (different than $d_{min}$), containing the lines' geometry details.

A fast, generic and plug & play solution is provided in preferred embodiments via a heuristic and recursive approach. The optimization process starts in the root node (N0 in FIG. 2) and recursively in a debt-first manner balances the leaf nodes first and then goes back, up to the root node and orchestrates the child nodes, considering the total load balance in the current node. This solution achieves a significant load balance improvement and power loss minimization in poorly balanced networks. It does not guarantee (1) an ideally balanced phase load measured in the PDN's root node (or other non-leaf node) or (2) a minimum power loss configuration.

To verify the heuristic algorithm's impact, we define a heuristic $D_{PDN}$ as $$D_{PDN} = \frac{d_{N1} + d_{N2} + \ldots + d_{Nn}}{n}, \qquad (12)$$

where N0, N1, . . . , Nn are all nodes in the PDN and $d_{Nx}$ refers to the total load disbalance (defined in (3)) measured in the node Nx We tested the proposed solution on the IEEE 34-Bus Mod1, IEEE 34-Bus Mod2, 37-Bus and 123-Bus real PDN models. The results are shown in Table 1. The measured values of the implementation on the IEEE 34-Bus Mod1 are as follows. The initial network losses are $$DP_{34\text{-}Bus\_Mod1}=266.875 \text{ kW}, DQ_{34\text{-}Bus\_Mod1}=-26.274 \text{ kvar} \qquad (13)$$

with an overall unsbalance $$D_{PDN_{34\text{-}Bus\_Mod1}} = 21.41\%$$

=21.41% and the total load measured in the root.

TABLE 1

Active and reactive power losses minimization.

| Model | DP [kW] | DQ [kvar] | $DP_{DILB}$ [kW] | $DQ_{DILB}$ [kvar] | Minimization $\frac{DP - DP_{DILB}}{DP}$ [%] |
|---|---|---|---|---|---|
| 34-Bus Mod1 | 266.875 | −26.274 | 262.009 | −31.455 | 1.82 |
| 34-Bus Mod2 | 258.984 | 25.880 | 229.575 | −1.689 | 11.35 |
| 37-Bus | 151.959 | 385.707 | 145.955 | 375.288 | 3.95 |
| 123-Bus | 91.722 | 190.373 | 87.075 | 177.322 | 5.07 |

TABLE 2

Total phase load measured in the root node.

| Model | Initial [kW] | | | $D_{PDN}$ [%] | After DILB [kW] | | | $D_{PDN}$ [%] |
|---|---|---|---|---|---|---|---|---|
| | $P_r$ | $P_s$ | $P_t$ | | $P_r$ | $P_s$ | $P_t$ | |
| 34-Bus Mod1 | 1274 | 1252 | 1247 | 21.41 | 1263 | 1255 | 1255 | 16.92 |
| 34-Bus Mod2 | 1274 | 1252 | 1247 | 17.64 | 1167 | 1355 | 1251 | 16.89 |
| 37-Bus | 671 | 583 | 825 | 18.77 | 907 | 508 | 664 | 15.05 |
| 123-Bus | 1630 | 1125 | 1365 | 13.14 | 1395 | 1490 | 1235 | 11.34 |

Although it is obvious that the load is initially well balanced among all phases, the DILB algorithm causes a certain power loss decrease of 5 kW or 1.82%. Yearly, this minor power loss decrease in the IEEE 34-Bus Mod1 network will result in savings of 42626 kWh. The active and reactive power losses after DILB reconfiguration of the network are $$DP_{34\text{-}Bus\_Mod1\_DILB}=262.009 \text{ kW}, DQ_{34\text{-}Bus\_Mod1\_DILB}=-31.455 \text{ kvar} \quad (15)$$

with an overall disbalance $$D_{PDN_{34\text{-}Bus\_Mod1\_DILB}} = 16.92\%$$

=16.92% which is 4.49% better, compared to the initial unbalance

In some of the network models the resulting phase load disbalance measured in the root ($d_{root}$) is improved (34-Bus Mod1, 123-Bus), but in other models it is worse than the initial one (34-Bus Mod2, 37-Bus), as shown in Table 2. However, in any case the value of $D_{PDN}$ and the active power loss decrease which is the main goal of DILB In the case of the 34-Bus Mod2 network model, the active power loss minimization reaches 11.35% which is a significant improvement. For the example data set, that will result in savings of 257623 kWh per year. This was based upon an artificial network of the structure of FIG. 1. The network used data from measurement logs from 9 from local industrial power meters and virtually placed them in the place of child nodes N1-N9.

Prototype and Architecture

In FIG. 4, server 40 can be a web application in the cloud, accessible via the Internet 44. The clients $42_1$-$42_N$ can be terminal stations connected to (or embedded in) the power meter. The web application/server 40 provides registration of power distribution network or part of a network (building, neighborhood and etc.) and configuration of its tree parameters (important for power losses calculation). Clients $42_1$-$42_N$ continuously or periodically send measurements to the server 40, receive the rotation vector s and rotate phases in the required state. The server 40 continuously or periodically recalculates the optimal vector s In preferred embodiments, the communication is REST-based, i.e. clients communicate with the server via web services. The two most important services for the client are (1) to send update of the measurements to the server and (2) to receive the rotation state. Both services can be integrated in a single http request, but it is important to note that the update interval may (will) differ from the allowed rotation interval.

Figure 5:
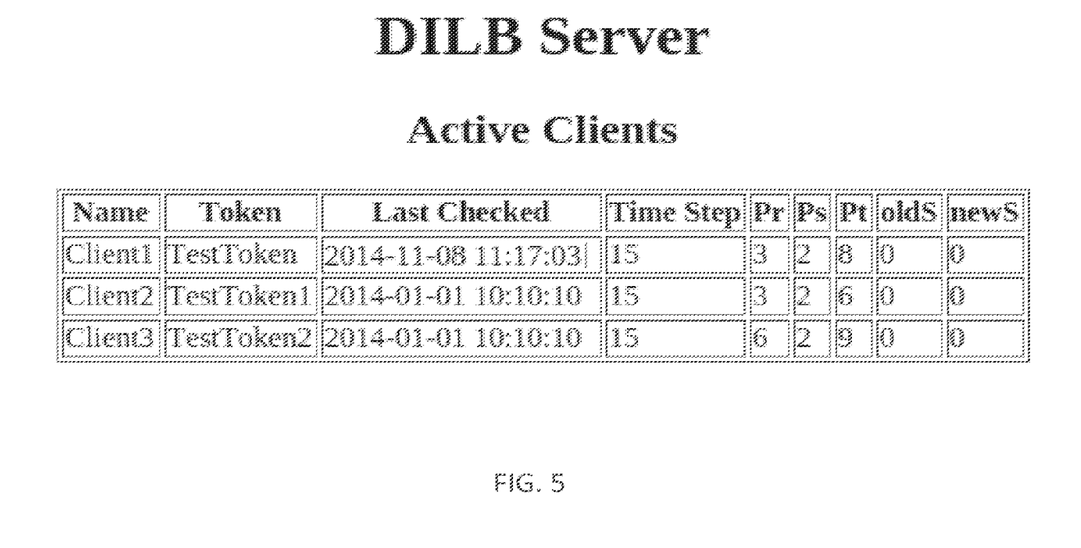
FIG. 5 shows an example a list of connected devices and calculates optimal rotational vector for a node.

A preferred version of the server 40 is a Java web application. An example output screen shows a list of connected clients and their parameters and is shown in FIG. 5. The optimal s will be calculated in the background in a specified time interval. So, when the terminal station requests its S value, it will receive it immediately, instead of waiting for the calculation in runtime. The recalculation interval can be configured by the network administrator.

Figure 6:
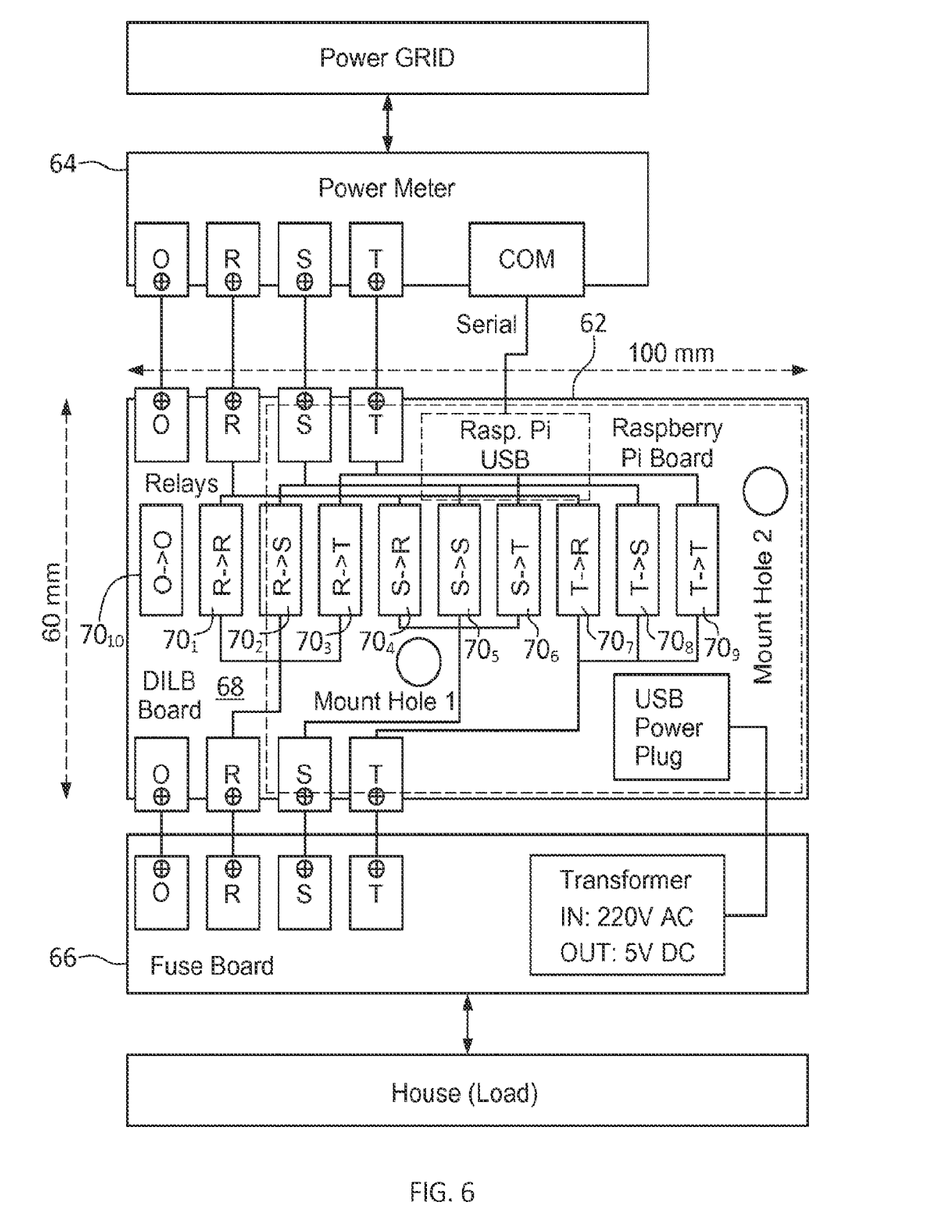
FIG. 6 illustrates a preferred embodiment dynamic intelligent load balancing board and power meter with relay switches.

A preferred way to modify an existing meter is to add to add a phase switching module (set of controllable relay switches or other switching device/s) and add a microcomputer 62 between a power meter 64 and a fuse board 66 as shown in FIG. 6. A commercially available Raspberry Pi model B small-sized computer provides adequate hardware requirements and provides a sufficient software stack (such as OS, network, GPIO and etc.) to implement the DILB client. The Raspberry Pi boots from an SD-card or even via network and provides convenient client-side maintenance or upgrades.

The Raspberry Pi board 62 in FIG. 6 is mounted on top of a main switching (DILB) board 68. The switching board consists of 9 relays $70_1$-$70_9$ to cover all possible switching states (R→R, R→S, R→T, S→S, S→T and etc.) and a relay to control the 0-wire. A $10^{th}$ relay $70_{10}$ is for protection only and covers the 0->0 relation. If all 10 relays are switched off, then the node is isolated from the PDN (the zero wire is also switched off). The RST0 notation indicates the three phases and a neutral, and is comparable to an ABCN notation scheme. The RST contacts are connected through the relays $70_1$-$70_9$. The relays provide better system scalability (to cover applicability in 2-phase, 3-phase, 4-phase and etc. networks) than do the rotary switches. In production, the DILB client can be improved by thyristors or a custom fast-switching electronic modules, that are also alternatives to a relay based phase switch.

In an example embodiment, the Raspberry Pi board runs linux (RASPBIAN distribution, kernel 3.12) that provides full network software stack. The board is connected to the communication interface (COM) of the power meter in order to receive its measurements and it is connected to LAN in order to access the DILB server via Internet. Access to the power meter parameters is often restricted, but this can be implemented by a network company or on its behalf. Communications privileges can be limited to the DILB.

The minimal allowed switching interval may differ among different networks. A PHP web server and simple client configuration web application can be implemented. Each client can be configured with its name, the server URL, its security authentication token and the allowed switching interval.

The preferred approaches of the invention can solve PDN load balancing problems and active power losses minimization. The proof of concept has been introduced using a simple network with one parent node and its children and afterwards generalized for a whole PDN tree. We have explored the DILB-extended architecture implementation issues and the simulation results with the real locally collected power meter data and the IEEE 34-Bus (Mod1 and Mod2), 37-Bus and 123-Bus network models which have confirmed the positive impact of our solution to the overall load balance and the minimization of the power losses in a PDN.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for load balancing in a hierarchical power distribution network, the method comprising:
   connecting a plurality of nodes in a plurality of levels in the hierarchical power distribution network, wherein each of the plurality of nodes in the plurality of levels includes a power meter and phase switches, wherein the phase switches rotate connections of phase contacts for a plurality of phases, wherein one of the plurality of nodes is a root node residing at a highest level in the hierarchy of the power distribution network, wherein the root node is directly connected to a subset of the plurality of nodes in a next lower level of the hierarchy, and wherein subsequent subsets of the plurality of nodes in subsequent lower levels of the hierarchy are directly connected to a previous higher level of the hierarchy;
   monitoring power drawn by a plurality of loads in the plurality of phases in the plurality of nodes through the power meters at the plurality of nodes;
   rotating the phase switches of the subset of nodes in the lowest level of the hierarchy in the plurality of phases to minimize the difference among the loads of the subset of nodes in the lowest level in each of the plurality of phases; and
   repeating the step of rotating for each of the previous higher levels in the hierarchy until the root node is reached to maximize the load balance in the root node.

2. The method of claim 1, wherein the plurality of nodes are arranged in a tree topology.

3. The method of claim 1, wherein said monitoring comprises:
   determining a power vector at each of the plurality of nodes for each of the plurality of phases; and
   arranging a matrix of the power vectors for the plurality of node.

4. The method of claim 1, wherein said rotating rotates phases without altering phase order.

5. The method of claim 1, wherein said connecting comprises communicating monitored power to other nodes among a plurality of nodes in the levels below the root node.

6. The method of claim 5, wherein said communicating communicates monitored power of a first node in a level below the root node to a second node in a higher level than the first node, and wherein the second node commands the rotation of the phase switches of the first node.

7. The method of claim 5, wherein said communicating communicates monitored power to a server that commands phase switches in lower level nodes of the plurality of nodes.

8. The method of claim 7, wherein said communicating is through the Internet to said server.

9. The method of claim 7, wherein the server comprises a web application.

10. The method of claim 9, wherein said communicating comprises nodes sending power measurements to the server and receiving a phase rotation state from the server.

11. The method of claim 1, wherein each of the nodes comprises:
    connections for a power source and a load;
    communications means for conducting said connecting by sending measured power and for receiving phase rotation commands;
    a phase rotation switch for conducting said rotating by rotating phase delivered by the power source to the load by switching the connections between the power source and the load.

12. The method of claim 11, wherein said phase rotation switch comprises a rotary cam switch.

13. The method of claim 11, wherein said phase rotation switch comprises a plurality of relays.

14. The method of claim 11, wherein said phase rotation switch comprises an electronic switch.

15. The method of claim 11, wherein each of the plurality of nodes comprises a residential or business unit power metering device.

16. A method for load balancing in a power distribution network, the method comprising:
    connecting a plurality of nodes in the power distribution network, wherein each of the plurality of nodes includes a power meter and phase switches;
    monitoring power drawn by one or more loads in multiple phases in one or more of the plurality of nodes through the respective power meter at the one or more of the plurality of nodes;
    balancing, by commanding one or more of the phase switches to rotate phases, to balance load distribution among the phases of the plurality of nodes, wherein said balancing comprises:
    determining a power vector at each of the plurality of nodes for each of the multiple phases;
    arranging a matrix of the power vectors for the plurality of nodes; and
    rotating selected phases to reduce differences among loads in the phases, wherein each power vector is defined as:

$$P_j = [P_{rj} P_{sj} P_{tj}]^T, \quad (1)$$

where T denotes a transpose function, and $P_j$ is the respective power vector and $P_{rj}$, $P_{sj}$ and $P_{tj}$ are the power drawn by the respective load in multiple phases r, s and t, and the matrix of power vectors is:

$$P_{rst} = \begin{bmatrix} P_{r1} & P_{r2} & & P_{rn} \\ P_{s1} & P_{s2} & \ldots & P_{sn} \\ P_{t1} & P_{t2} & & P_{tn} \end{bmatrix}, \quad (2)$$

and wherein said rotating reduces the difference d among the plurality of loads in the multiple phases by reducing the following expression:

$$d = 100 * \frac{|P_r - P_s| + |P_s - P_t| + |P_t - P_r|}{2*(P_r + P_s + P_t)}, \quad (3)$$

where $$P_r = \sum_{j=1}^{n} P_{rj} \quad (4)$$

and $$P_s = \sum_{j=1}^{n} P_{sj} \text{ and } P_t = \sum_{j=1}^{n} P_{tj}.$$

* * * * *